Nov. 14, 1950  W. A. BORTNER ET AL  2,529,908
CARGO HOIST

Filed Sept. 15, 1945  3 Sheets-Sheet 1

INVENTORS.
WILLIAM A. BORTNER
WILLIAM W. COLLINS
EUGENE J. TOUSIGNAN
BY
Donald W. Farrington
ATTORNEY Nov. 14, 1950  W. A. BORTNER ET AL  2,529,908
CARGO HOIST Filed Sept. 15, 1945  3 Sheets-Sheet 2

INVENTORS.
WILLIAM A. BORTNER
WILLIAM W. COLLINS
EUGENE J. TOUSIGNAN
BY
Donald W. Farrington
ATTORNEY

INVENTORS.
WILLIAM A. BORTNER
WILLIAM W. COLLINS
EUGENE J. TOUSIGNAN
BY
ATTORNEY

Patented Nov. 14, 1950

2,529,908

UNITED STATES PATENT OFFICE 2,529,908

CARGO HOIST

William A. Bortner, Baltimore, Md., William W. Collins, Wilmington, Del., and Eugene J. Tousignan, Baltimore, Md., assignors to The Glenn L. Martin Company, Middle River, Md., a corporation of Maryland Application September 15, 1945, Serial No. 616,564

13 Claims. (Cl. 244—137)

This invention relates to cargo handling in an airplane, particularly to the structural features of an airplane that facilitate the loading and unloading of cargo.

Loading cargo into an airplane has always presented somewhat of a problem and the problem increases with the size of the airplane and weight of the cargo. In most airplanes, it is usual to load cargo through doors in the sides of the hull or fuselage. There is no difficulty with cargo that can be lifted by hand and placed manually within the ship but when it is necessary to load heavy cargo such as a crate weighing hundreds or even thousands of pounds, handling equipment becomes imperative.

Seaplanes afloat have presented quite a problem when heavy cargo was placed on board because of the inherent instability of the craft, until the present cargo handling system was devised. Because of the instability of the craft, with the best cargo handling facilities, if the craft should roll or pitch when heavy cargo was near the side of the hull or the door frame, the impact of the cargo on the hull might do considerable damage. While a land based plane is more stable, it is a considerable advantage to the efficiency of transposition if no handling equipment has to be provided at the terminal, such as cranes or special cargo handling devices. Cargo handling equipment not being always available would limit the transportation of heavy cargo by airplane to those terminals so equipped. Cargo handling equipment must be provided for loading heavy articles into any type airplane and because of the light weight metal construction of the airplane, the cargo must be handled with care and precision so as not to damage the airplane structure.

By the present invention a system is provided to facilitate the loading and unloading of an airplane by self-contained handling equipment.

An object of the invention is to provide cargo handling equipment integral with the airplane construction.

Another object of the invention is the provision of the tracks in the underside of the airplane wing and a self-powered travelling hoist mounted to move on the tracks to transport cargo from a position on either side of the fuselage to a point within the fuselage.

Another object of the invention is the provision of a cargo hoist and continuous tracks for the hoist extending on the underside of the wing through the hull to afford a very flexible loading system.

Another object is the provision of a sprocket chain along the track that is fed through the self-powered hoist to afford a positive and precise control for the movement of cargo along the track into and out of the airplane and which will prevent inadvertent movement of the cargo while loading if the airplane should tilt and incline the tracks downwardly.

Further and other objects will become apparent from the description of the accompanying drawings, which form a part of this disclosure and in which like numerals refer to like parts.

Figure 1:
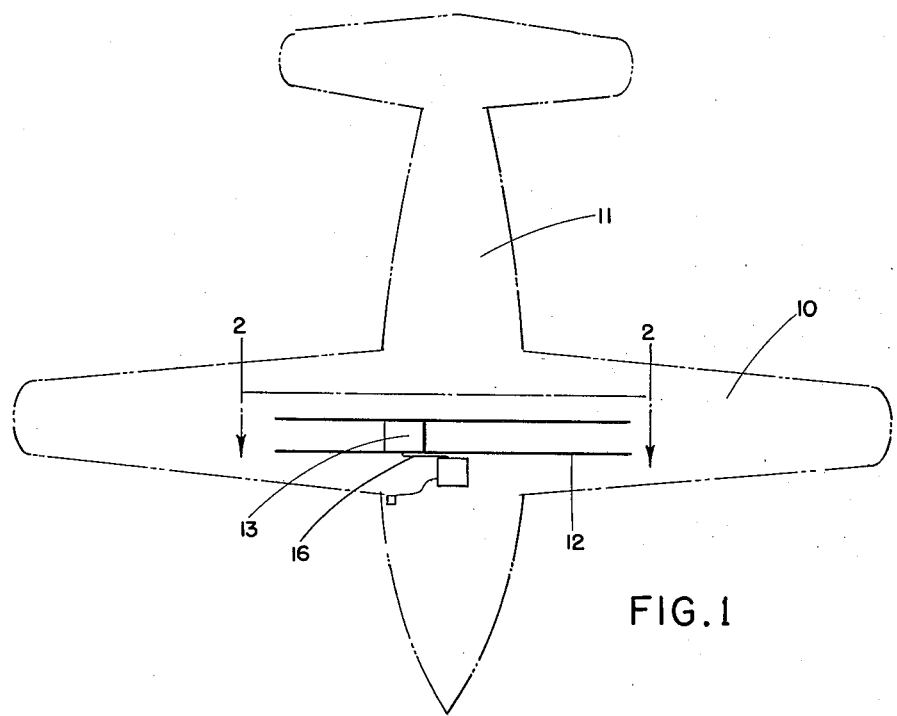
Figure 1 is a diagrammatic plan view showing the location of the tracks for the cargo hoist on the airplane.
Figure 2:
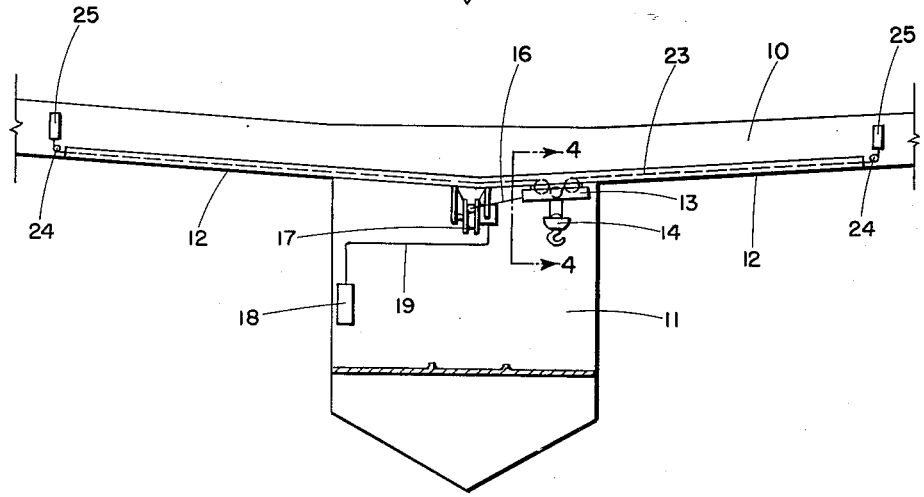
Figure 2 is an enlarged fragmentary diagrammatic sectional view taken on the line 2—2 of Figure 1 showing the arrangement of the track in the wing, the hoist and carriage.
Figure 3:
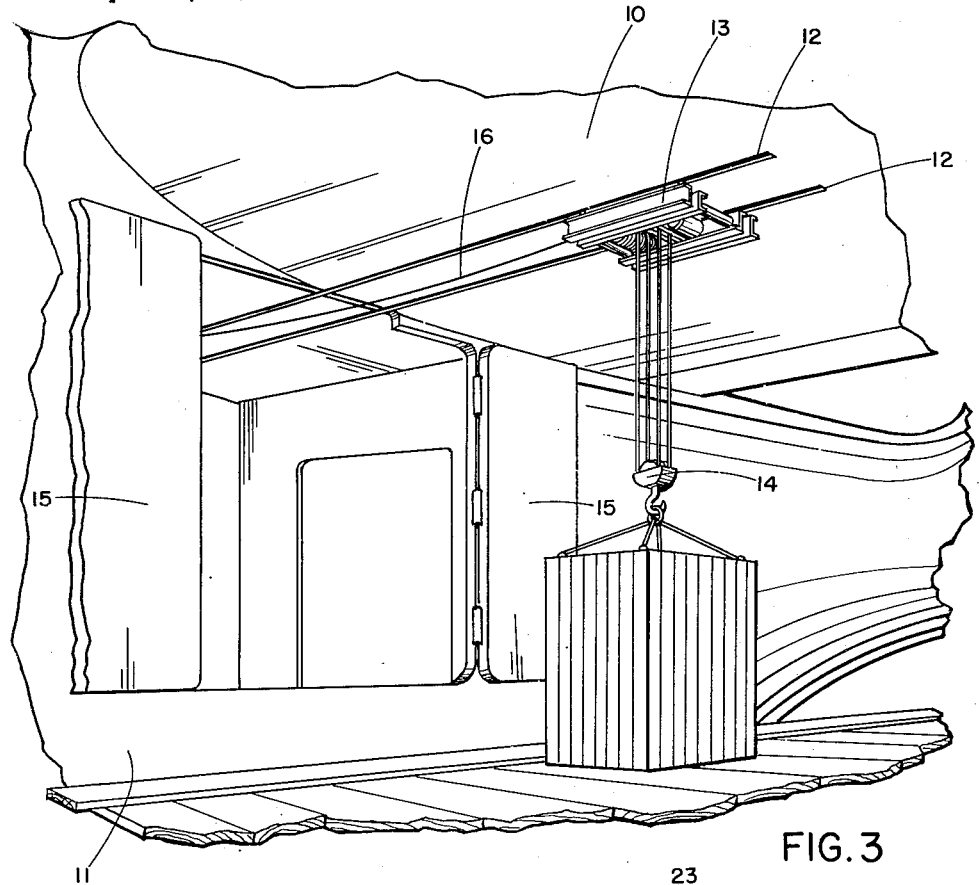
Figure 3 is a fragmentary perspective view of the loading door under the wing of the airplane showing the track, carriage and hoist.

The general location of the cargo handling apparatus applied to the airplane is shown diagrammatically in Figures 1 and 2. Figure 1 shows the conventional arrangement of wing 10 and the centrally located hull or fuselage 11 which forms the cargo carrying compartment. The track 12 on which the carriage 13 is mounted is located at or very near the center of gravity of the airplane shown in plan view in Figure 1. It will be noted that track 12 extends from a point on the underside of the wing on one side of the hull through the fuselage and out the other side of the hull under the wing. Carriage 13 supports a hook 14 and suitable hoisting mechanism so that when the carriage is in a position under the wing, cargo may be lifted vertically and then moved into the cargo compartment within the hull or fuselage 11. This is better shown in Figure 3 which in addition to the above described structure shows the relationship of the tracks 12 under the wing extending through the cargo loading doors 15 in the sides of the hull.

The power to operate the hoisting mechanism and the motors that drive the carriage along the track is supplied through flexible cable 16. This cable is wound on a retracting reel 17 located at one side of the track within the hull. A control box 18 is provided on cable 19 so that the motion of the carriage and of the hoist may be controlled from a remote but any convenient point within or just outside of the cargo loading doorway. As the carriage 13 moves from one end of the track to the other, reel 17 pays cable 16 out to afford the electric power for the carriage.

Figure 4:
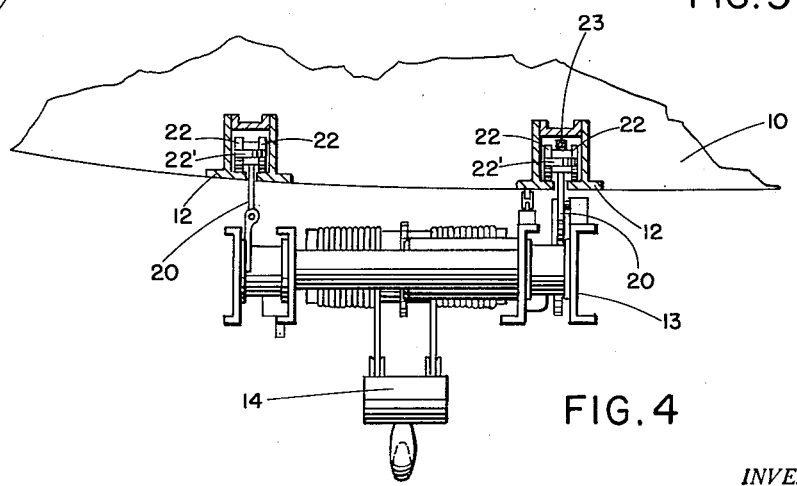
Figure 4 is an enlarged sectional view through the track in the underside of the wing showing the carriage and hoist.
Figure 5:
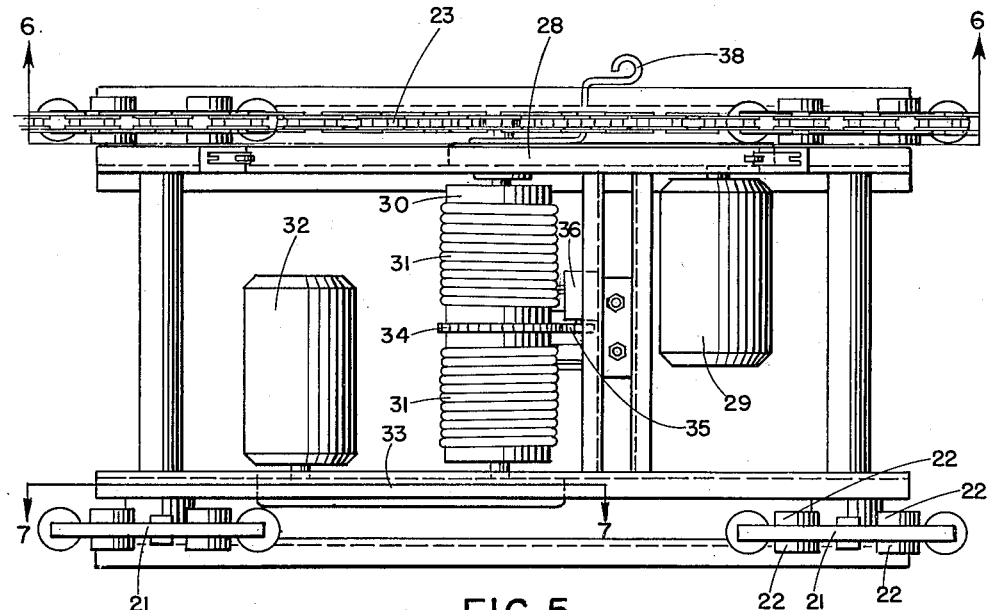
Figure 5 is an enlarged detailed plan view of the carriage and hoist.
Figure 6:
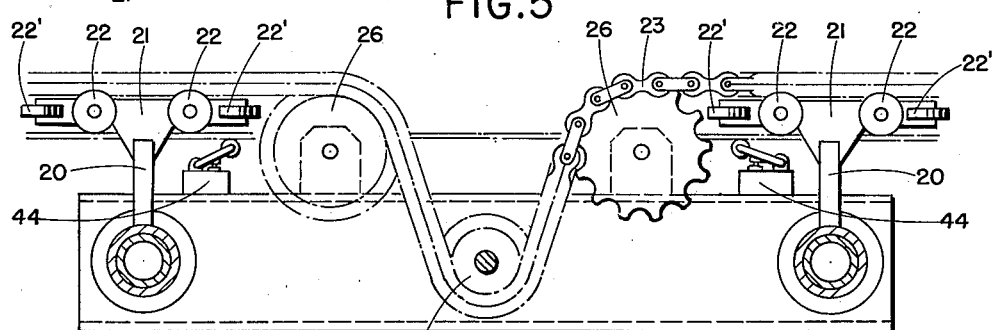
Figure 6 is a sectional view taken on the line 6—6 of Figure 5.
Figure 7:
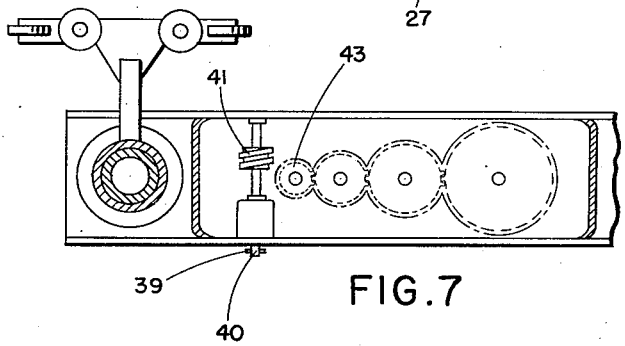
Figure 7 is a fragmentary sectional view taken on the line 7—7 of Figure 5 showing the manual hoisting arrangement.

As will be shown in Figures 4 to 6, carriage 13 is suspended from channel tracks 12 by supports generally indicated as 20 which have on their upper ends brackets 21 on which are mounted wheels 22 that move on the flanges of channel track 12 throughout the length of the track. The four wheels 22 on each of the four brackets support the total load of the carriage and the cargo from tracks 12. Horizontal wheels 22' on the brackets prevent the carriage supports from binding on the sides of the channel tracks. To drive carriage 13 along the tracks, a chain 23 is provided that extends along one track and passes over pulleys 24 at the end of the track and is secured to tensioning members 25, at each end. The carriage chain 23 passes over guiding sprockets 26 to a driving sprocket 27. Sprocket 27 is driven by motor 29 through a gearing in housing 28. When motor 29 is energized and sprocket 27 is rotated, the carriage will be pulled along the track by the sprocket 27 moved along chain 23. Motor 29 is of the well-known type shown in Patent Number 2,220,983 for example, incorporating a brake means therein which holds the motor shaft against rotation except when the motor is energized. Since the sprocket is geared thereto, it will be held against rotation when the motor is de-energized, thus preventing undesired movement of the carriage due to tilting of the trackway or from other causes.

Members 25 may be hydraulic units or spring loaded units that maintain a predetermined tension in the chain to take up slack and shock from the loading or shifting of the cargo or the airplane.

Drum 30, on which are wound cables 31, is rotated by motor 32 through a gearing housed in 33. A gear 34 in the center of the drum rotates gear 35 which is connected to a limit switch device 36. Gear 35 rotates a screw threaded shaft carrying a contactor into contact with up and down limit switches to control the travel of the hoist.

If for any reason the power units fail, a clutch mechanism in housing 28 may be actuated by lever 38, to disconnect the motor and gearing from sprocket 27, thus releasing the latter from the normal holding action of the motor brake means so that the carriage may be moved freely along the track. Limit switches 44 are provided on the carriage to stop the carriage drive motor at the ends of the track. If the power unit or power failure should take place when the carriage is under either wing, due to the sloping under side of the wing, upon de-clutching the gearing, the carriage would move toward the cargo compartment.

If it is desired to operate the hoist manually, a long-handled crank is hooked onto pins 39 in shaft 40 and worm 41 is pulled into mesh with gear 43, so that the hoist may be operated by the crank.

While in the preferred embodiment of this invention, the chain and sprocket wheels are shown, it is to be understood that a cable could be substituted for the chain with suitable cable-engaging mechanisms to move the carriage along the track or a rack might also be used for the same purpose.

The preferred form of the invention has been described above in connection with the illustrations showing the seaplane but it is contemplated that the cargo loading structure herein described may be used with high-wing land based planes of the single fuselage type or of the twin boom type having the cargo compartment carried by the wing between the booms.

It is to be understood that certain changes, alterations, modifications and substitutions can be made without departing from the spirit and scope of the appended claims.

We claim as our invention:

1. In an airplane comprising a fuselage, wings extending laterally from the sides of said fuselage, cargo loading doorways in the sides of the fuselage under each wing, track means mounted in the under side of each wing, said track means extending through the fuselage and said doorways, a carriage mounted to move along said track means, a chain extending from a point adjacent one end of said track means to the other end of said track means, said chain passing through chain engaging means mounted on said carriage, motor means to drive said chain-engaging means to move the carriage along said track means, and resilient means securing each end of said chain to said wing adjacent the end of said track to maintain said chain under predetermined tension.

2. A cargo handling system for an airplane having a fuselage, wings extending laterally from the sides of said fuselage, comprising cargo loading doorways in the sides of the fuselage under each wing, track means mounted in the under side of each wing, said track means extending from the fuselage and through said doorways, a carriage mounted to move along said track means, a chain having the ends thereof resiliently secured in said wing and extending from a point adjacent one end of said track means to the other end of said track means, said chain passing over chain-engaging means mounted on said carriage, motor means to drive said chain-engaging means to move the carriage along said track means.

3. In an airplane comprising a fuselage, wings extending laterally therefrom adjacent the top of the fuselage, oppositely disposed cargo loading doorways in the sides of said fuselage under said wings, a continuous track means having its end portions secured in and extending along the under side of the wings and its intermediate portion extending through said fuselage and doorways, a carriage mounted to move along said track means, said track means being unobstructed throughout its entire length whereby said carriage is movable therealong from a position under one wing through the fuselage to a position under the opposite wing, and cargo hoisting means mounted on said carriage.

4. In an airplane comprising a fuselage, wings extending laterally from the sides of said fuselage, cargo loading doorways in the sides of the fuselage under each wing, track means mounted in the under side of each wing, said track means extending through the fuselage and said doorways, a carriage mounted to move along said track means, a chain extending from a point adjacent one end of said track means to the other end of said track means, said chain passing through chain-engaging means mounted on said carriage, motor means to drive said chain-engaging means to move the carriage along said track means.

5. A cargo handling system for an airplane having a fuselage, wings extending laterally from the sides of said fuselage, comprising cargo loading doorways in the sides of the fuselage under each wing, track means mounted in the under side of each wing and flush with the fuselage thereof, said track means extending through the fuselage and said doorways, a carriage mounted to move along said track means, a sprocket chain extending from a point adjacent one end of said track means to the other end of said track means, said chain passing over sprocket means mounted on said carriage, motor means to drive said sprocket means to move the carriage along said track means, and resilient means securing each end of said chain to said wing adjacent the end of said track to maintain said chain under predetermined tension and to absorb shock loads.

6. In an airplane comprising a fuselage, wings extending laterally therefrom adjacent the top of the fuselage, oppositely disposed cargo loading doorways in the sides of said fuselage under said wings, a continuous track means having its end portions secured in and extending along the underside of the wings and its intermediate portion extending through said fuselage and doorways, a carriage mounted to move along said track means from a position under one wing through the fuselage to a position under the opposite wing, cargo hoisting means mounted on said carriage, and means extending along said track means engaging said carriage to prevent inadvertent movement of said carriage on said track.

7. In an airplane having a cargo carrying compartment, wings extending laterally from the sides of said compartment, cargo loading doorways in the sides of the compartment under each wing, track means mounted in the under side of each wing, said track means extending through the compartment and said doorways, a carriage mounted to move along said track means, a chain extending from a point adjacent one end of said track means to the other end of said track means, said chain passing over sprocket means mounted on said carriage, motor means to drive said sprocket means to move the carriage along said track means, and resilient means securing each end of said chain to said wing adjacent the end of said track to maintain said chain under predetermined tension.

8. A cargo handling system for an airplane having a fuselage, wings extending laterally therefrom adjacent the top of the fuselage, comprising oppositely disposed cargo loading doorways in the sides of said fuselage under the wings, a continuous track means having its end portions secured in and extending along the underside of the wings and flush with the surface thereof, and its intermediate portion extending through said fuselage and doorways, a power operated carriage mounted to move along said track means, said track means being unobstructed throughout its entire length whereby said carriage is movable therealong from a position under one wing through the fuselage to a position under the opposite wing, a power operated cargo hoisting means mounted on said carriage, and means to control said hoisting means and carriage movement from a point within said fuselage.

9. A cargo handling system for an airplane having a fuselage, wings extending laterally from the sides of said fuselage, comprising cargo loading doorways in the sides of the fuselage under each wing, track means mounted in the under side of each wing, said track means extending from the fuselage and through said doorways, a carriage mounted to move along said track means, a chain having the ends thereof resiliently secured in said wing and extending from a point adjacent one end of said track means to the other end of said track means, said chain passing over chain-engaging means mounted on said carriage, motor means to drive said chain-engaging means to move the carriage along said track, and means to control said hoisting means and carriage movement from a point within said fuselage.

10. A cargo handling system for an airplane having a fuselage, wings extending laterally from the sides of said fuselage, comprising cargo loading doorways in the sides of the fuselage under each wing, track means mounted in the under side of each wing and flush with the surface thereof, said track means extending through the fuselage and said doorways, a carriage mounted to move along said track means, a sprocket chain extending from a point adjacent one end of said track means to the other end of said track means, said chain passing over sprocket means mounted on said carriage, motor means to drive said sprocket means to move the carriage along said track means, means to control said hoisting means and carriage movement from a point within said fuselage, and resilient means securing each end of said chain to said wing adjacent the end of said track to maintain said chain under predetermined tension and to absorb shock loads.

11. In an airplane comprising a cargo carrying compartment, wings extending laterally from the sides of said compartment, cargo loading doorways in the sides of the compartment under each wing, track means mounted in the under side of each wing, said track means extending through the compartment and said doorways, a carriage mounted to move along said track means, a chain extending from a point adjacent one end of said track means to the other end of said track means, said chain passing over sprocket means mounted on said carriage, motor means to drive said sprocket means to move the carriage along said track.

12. In an airplane comprising a fuselage, wings extending laterally therefrom adjacent the top of the fuselage, oppositely disposed cargo loading doorways in the sides of said fuselage under each wing, a continuous track means having its end portions secured in and extending along the underside of the wings and its intermediate portion extending through said fuselage and doorways, a carriage mounted to move along said track means from a position under one wing through the fuselage to a position under the opposite wing, cargo hoisting means mounted on said carriage, and means for moving said carriage to and holding it at any point along said track means and comprising traction means extending along said track means from end to end thereof and engaging cooperating traction means on said carriage.

13. In an airplane comprising a cargo-carrying compartment, wings extending laterally from the sides of said compartment, cargo loading doorways in the sides of the compartment under each wing, track means mounted in the underside of the wings and extending through said doorways and said compartment, a carriage mounted to move along said track means, a traction strand extending from a point adjacent one end of said track means to the other end of said track means, traction means on the carriage engaging said traction strand, and means for driving said traction means.

WILLIAM A. BORTNER.
  WILLIAM W. COLLINS.
  EUGENE J. TOUSIGNAN.

REFERENCES CITED

The following references are of record in the file of this patent:

UNITED STATES PATENTS

| Number | Name | Date |
|---|---|---|
| 1,614,769 | Amsler | Jan. 18, 1927 |
| 1,838,772 | Lawrence | Dec. 29, 1931 |
| 2,231,524 | Martin | Feb. 11, 1941 |
| 2,268,009 | Babb et al. | Dec. 30, 1941 |
| 2,404,195 | Schlieben | July 16, 1946 |

FOREIGN PATENTS

| Number | Country | Date |
|---|---|---|
| 556,933 | Great Britain | Oct. 28, 1943 |